US012769181B2

(12) United States Patent
Kao et al.

(10) Patent No.: US 12,769,181 B2
(45) Date of Patent: Oct. 20, 2026

(54) APERTURE UNIT

(71) Applicant: Actutek Corporation, Taoyuan City (TW)

(72) Inventors: Kuo-Chun Kao, Taoyuan City (TW); Meng-Ting Lin, Taoyuan City (TW); I-Mei Huang, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 259 days.

(21) Appl. No.: 18/768,616

(22) Filed: Jul. 10, 2024

(65) Prior Publication Data

US 2024/0361562 A1 Oct. 31, 2024

Related U.S. Application Data

(63) Continuation of application No. 18/411,942, filed on Jan. 12, 2024, now Pat. No. 12,366,789, which is a
(Continued)

(51) Int. Cl.
*G02B 7/02* (2021.01)
*F03G 7/06* (2006.01)
(Continued)

(52) U.S. Cl.
CPC ............ *G03B 5/02* (2013.01); *F03G 7/0614* (2021.08); *F03G 7/06143* (2021.08); *G02B 3/04* (2013.01); *G02B 3/12* (2013.01); *G02B 3/14* (2013.01); *G02B 6/0025* (2013.01); *G02B 6/0066* (2013.01); *G02B 7/023* (2013.01); *G02B 7/08* (2013.01); *G02B 7/09* (2013.01); *G02B 7/102* (2013.01); *G02B 7/1805* (2013.01); *G02B 7/182* (2013.01); *G02B 7/1821* (2013.01); *G02B 13/0065* (2013.01); *G02B 13/0075* (2013.01); *G02B 13/009* (2013.01); *G02B 26/004* (2013.01); *G02B 26/0816* (2013.01); *G02B 26/0883* (2013.01); *G02B 27/0068* (2013.01); *G02B 27/0955* (2013.01); *G02B 27/0972* (2013.01); *G02B 27/0977* (2013.01);
(Continued)

(58) Field of Classification Search
USPC .......................................................... 348/373
See application file for complete search history.

(56) References Cited

U.S. PATENT DOCUMENTS 4,841,323 A * 6/1989 Yamada .................. G02B 7/10 396/90
7,262,927 B1 * 8/2007 Shyu ........................ G02B 7/08 369/44.14
(Continued)

*Primary Examiner* — Walter L Lindsay, Jr.
*Assistant Examiner* — Warren K Fenwick
(74) *Attorney, Agent, or Firm* — MUNCY, GEISSLER, OLDS & LOWE, P.C.

(57) ABSTRACT

An aperture unit having an optical axis is provided, which includes a fixed portion comprising a sidewall, a guiding element movably connected to the fixed portion, a first blade movably connected to the guiding element and the fixed portion, and a sliding element. The sidewall has a recessed portion having a recessed structure. The sliding element is at least partially accommodated in the recessed portion, and the guiding element is movable relative to the fixed portion through the sliding element.

20 Claims, 17 Drawing Sheets

Related U.S. Application Data continuation of application No. 17/651,758, filed on Feb. 18, 2022, now Pat. No. 11,906,807, which is a continuation of application No. 16/257,778, filed on Jan. 25, 2019, now Pat. No. 11,294,105.

(60) Provisional application No. 62/785,593, filed on Dec. 27, 2018, provisional application No. 62/782,664, filed on Dec. 20, 2018, provisional application No. 62/780,077, filed on Dec. 14, 2018, provisional application No. 62/760,320, filed on Nov. 13, 2018, provisional application No. 62/753,716, filed on Oct. 31, 2018, provisional application No. 62/711,036, filed on Jul. 27, 2018, provisional application No. 62/703,147, filed on Jul. 25, 2018, provisional application No. 62/688,694, filed on Jun. 22, 2018, provisional application No. 62/682,671, filed on Jun. 8, 2018, provisional application No. 62/625,600, filed on Feb. 2, 2018, provisional application No. 62/621,967, filed on Jan. 25, 2018.

(51) Int. Cl.

| | |
|---|---|
| ***F21V 8/00*** | (2006.01) |
| ***G02B 3/04*** | (2006.01) |
| ***G02B 3/12*** | (2006.01) |
| ***G02B 3/14*** | (2006.01) |
| ***G02B 7/08*** | (2021.01) |
| ***G02B 7/09*** | (2021.01) |
| ***G02B 7/10*** | (2021.01) |
| ***G02B 7/18*** | (2021.01) |
| ***G02B 7/182*** | (2021.01) |
| ***G02B 13/00*** | (2006.01) |
| ***G02B 26/00*** | (2006.01) |
| ***G02B 26/08*** | (2006.01) |
| ***G02B 27/00*** | (2006.01) |
| ***G02B 27/09*** | (2006.01) |
| ***G02B 27/64*** | (2006.01) |
| ***G03B 5/00*** | (2021.01) |
| ***G03B 5/02*** | (2021.01) |
| ***G03B 9/06*** | (2021.01) |
| ***G03B 9/14*** | (2021.01) |
| ***G03B 13/36*** | (2021.01) |
| ***G03B 17/17*** | (2021.01) |
| ***G06F 1/16*** | (2006.01) |
| ***G06T 7/00*** | (2017.01) |
| ***G06T 7/521*** | (2017.01) |
| ***G06T 15/08*** | (2011.01) |
| ***G09G 5/00*** | (2006.01) |
| ***H02K 41/035*** | (2006.01) |
| ***H04N 23/45*** | (2023.01) |
| ***H04N 23/51*** | (2023.01) |
| ***H04N 23/54*** | (2023.01) |
| ***H04N 23/55*** | (2023.01) |
| ***H04N 23/56*** | (2023.01) |
| ***H04N 23/57*** | (2023.01) |
| ***H04N 23/73*** | (2023.01) |
| *G02B 5/00* | (2006.01) |
| *G03B 5/04* | (2021.01) |

(52) U.S. Cl.

CPC ............ *G02B 27/646* (2013.01); *G03B 5/00* (2013.01); *G03B 9/06* (2013.01); *G03B 9/14* (2013.01); *G03B 13/36* (2013.01); *G03B 17/17* (2013.01); *G06F 1/1686* (2013.01); *G06T 7/521* (2017.01); *G06T 7/97* (2017.01); *G06T 15/08* (2013.01); *G09G 5/003* (2013.01); *H02K 41/0356* (2013.01); *H04N 23/45* (2023.01); *H04N 23/51* (2023.01); *H04N 23/54* (2023.01); *H04N 23/55* (2023.01); *H04N 23/56* (2023.01); *H04N 23/57* (2023.01); *H04N 23/73* (2023.01); *G02B 5/003* (2013.01); *G02B 13/004* (2013.01); *G03B 5/04* (2013.01); *G03B 2205/0007* (2013.01); *G03B 2205/0015* (2013.01); *G03B 2205/0069* (2013.01); *G06T 2207/10028* (2013.01); *G06T 2207/10048* (2013.01); *G09G 2354/00* (2013.01)

(56) References Cited

U.S. PATENT DOCUMENTS

| | | | | |
|---|---|---|---|---|
| 7,295,388 | B2 * | 11/2007 | Shyu | G02B 7/102<br>720/682 |
| 7,787,046 | B2 * | 8/2010 | Nagasaki | G03B 3/10<br>348/374 |
| 7,864,461 | B2 * | 1/2011 | Yoshioka | G02B 7/08<br>359/813 |
| 7,898,753 | B2 * | 3/2011 | Yu | G02B 7/08<br>359/824 |
| 10,133,038 | B2 * | 11/2018 | Hu | H04N 23/45 |
| 10,928,559 | B2 * | 2/2021 | Wang | F03G 7/0614 |
| 11,105,962 | B2 * | 8/2021 | Song | F03G 7/0614 |
| 11,294,105 | B2 * | 4/2022 | Kao | F03G 7/0614 |
| 11,906,807 | B2 * | 2/2024 | Kao | F03G 7/0614 |
| 12,366,789 | B2 * | 7/2025 | Kao | F03G 7/0614 |
| 12,498,619 | B2 * | 12/2025 | Kao | F03G 7/0614 |
| 2019/0227201 | A1 * | 7/2019 | Kao | F03G 7/0614 |
| 2019/0227259 | A1 * | 7/2019 | Hsu | F03G 7/0614 |
| 2024/0361564 | A1 * | 10/2024 | Kao | F03G 7/0614 |

* cited by examiner

APERTURE UNIT

CROSS-REFERENCE TO RELATED APPLICATIONS

This application is a continuation application of U.S. patent application Ser. No. 18/411,942, filed on Jan. 12, 2024, which is a continuation application of U.S. Pat. No. 11,906,807 B2, filed on Feb. 18, 2022, which is a continuation application of U.S. Pat. No. 11,294,105 B2, filed on Jan. 25, 2019, which claims priority of provisional U.S. Patent Application No. 62/621,967, filed on Jan. 25, 2018, No. 62/625,600, filed on Feb. 2, 2018, No. 62/682,671, filed on Jun. 8, 2018, No. 62/688,694, filed on Jun. 22, 2018, No. 62/703,147, filed on Jul. 25, 2018, No. 62/711,036, filed on Jul. 27, 2018, No. 62/753,716, filed on Oct. 31, 2018, No. 62/760,320, filed on Nov. 13, 2018, No. 62/780,077, filed on Dec. 14, 2018, No. 62/782,664, filed on Dec. 20, 2018, No. 62/785,593, filed on Dec. 27, 2018, which are incorporated by reference herein in their entirety.

BACKGROUND OF THE INVENTION

Field of the Disclosure

The present disclosure relates to an aperture unit, and more particularly to an aperture disposed in an image capturing device.

Description of the Related Art

As technology has advanced, a lot of electronic devices (such as cameras and smartphones) have incorporated the functionality of taking photographs and recording video. These electronic devices have become more commonplace, and have been developed to be more convenient and thin.

In some electronic devices, several coils and magnets corresponding thereto are usually used for adjusting the focus of a lens. However, miniaturization of the electronic devices may increase the difficulty of mechanical design, and it may also lead to low reliability and low driving force for moving the lens. Therefore, addressing the aforementioned problems has become a challenge.

BRIEF SUMMARY OF INVENTION

An aperture unit having an optical axis is provided, which includes a fixed portion comprising a sidewall, a guiding element movably connected to the fixed portion, a first blade movably connected to the guiding element and the fixed portion, and a sliding element. The sidewall has a recessed portion having a recessed structure. The sliding element is at least partially accommodated in the recessed portion, and the guiding element is movable relative to the fixed portion through the sliding element.

BRIEF DESCRIPTION OF DRAWINGS

The disclosure can be more fully understood by reading the subsequent detailed description and examples with references made to the accompanying drawings, wherein.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
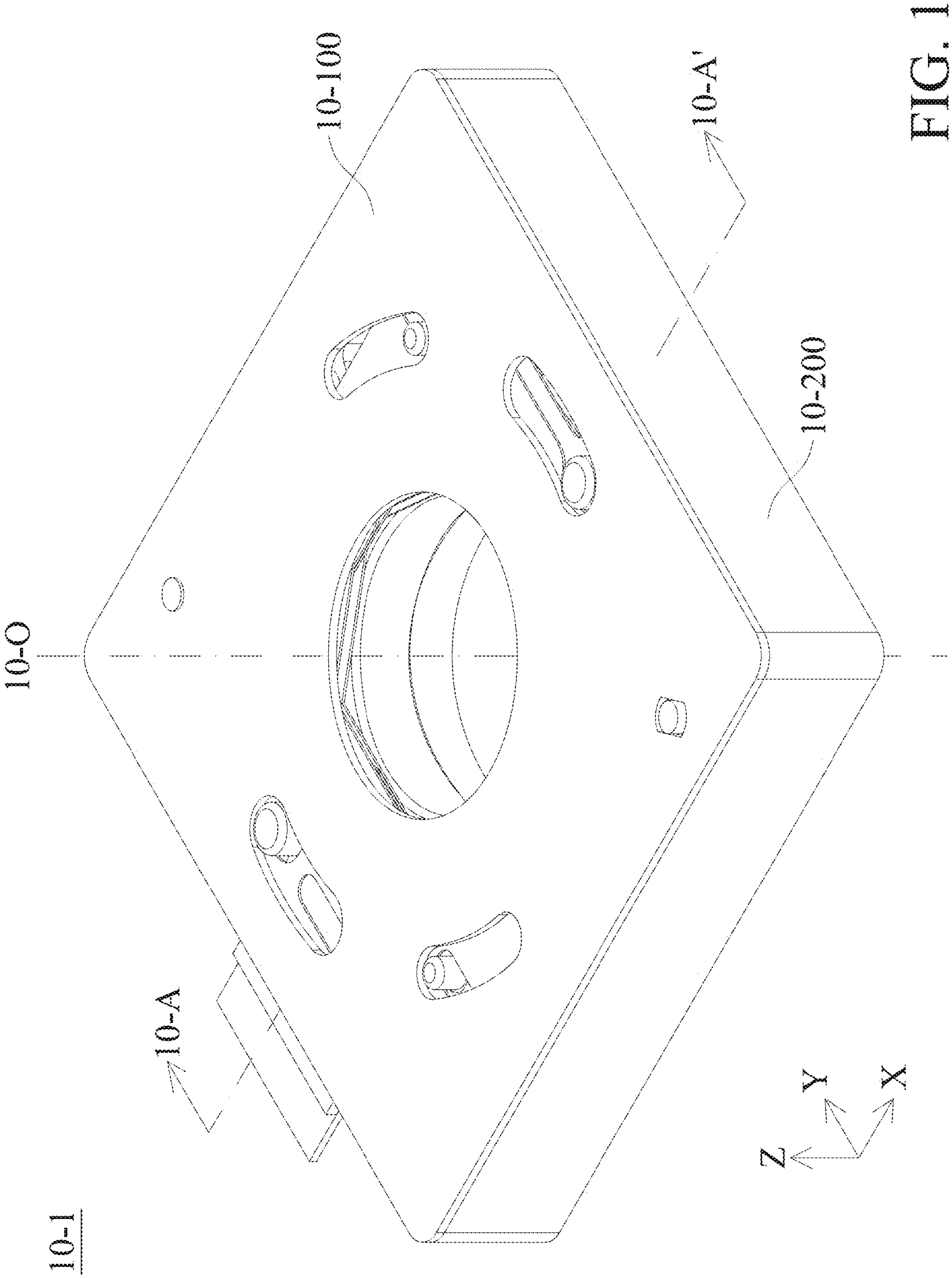
FIG. 1 is a perspective view of an aperture unit according to some embodiments of the present disclosure.
Figure 2:
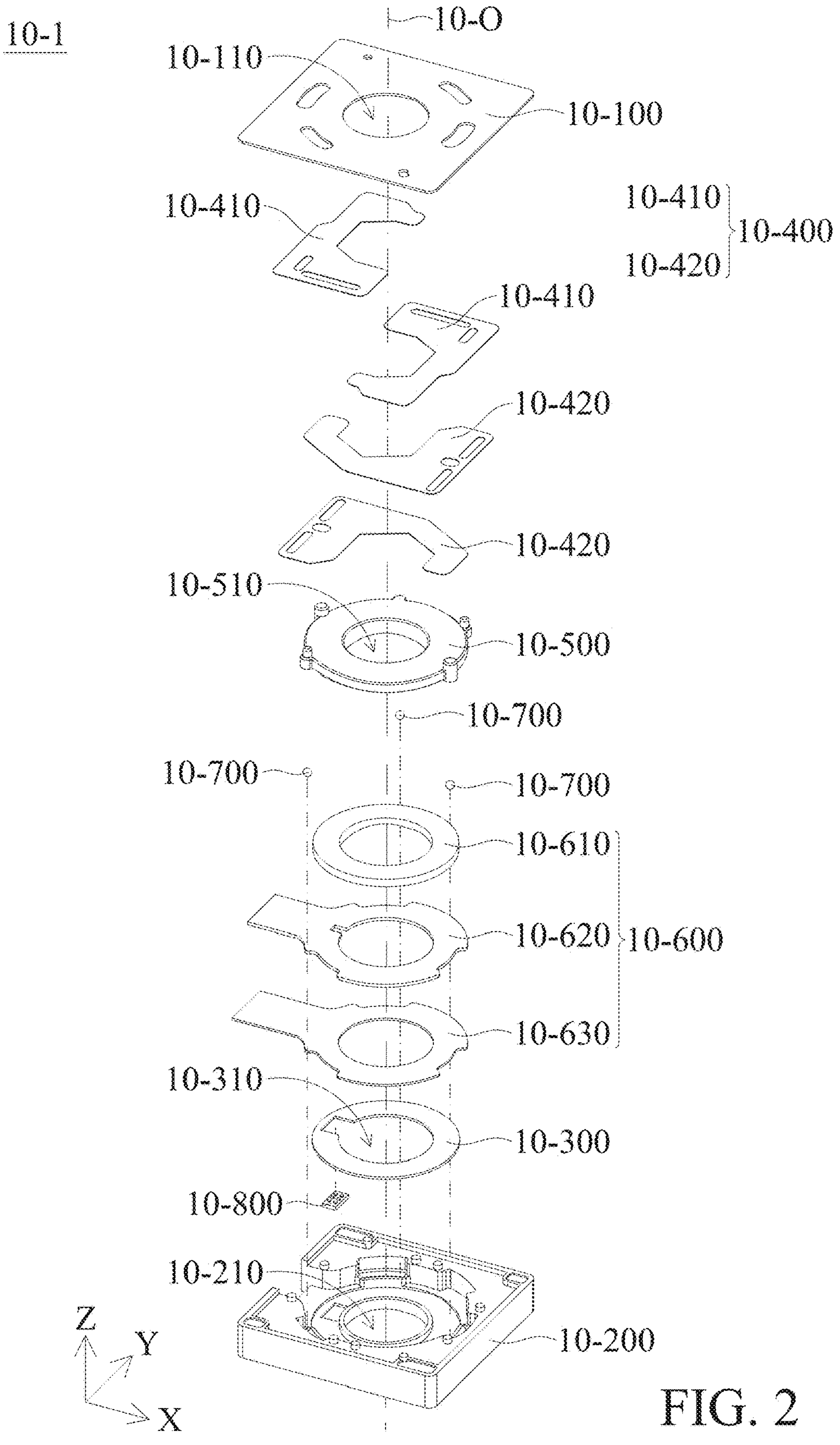
FIG. 2 is an exploded view of the aperture unit in FIG. 1.
Figure 3:
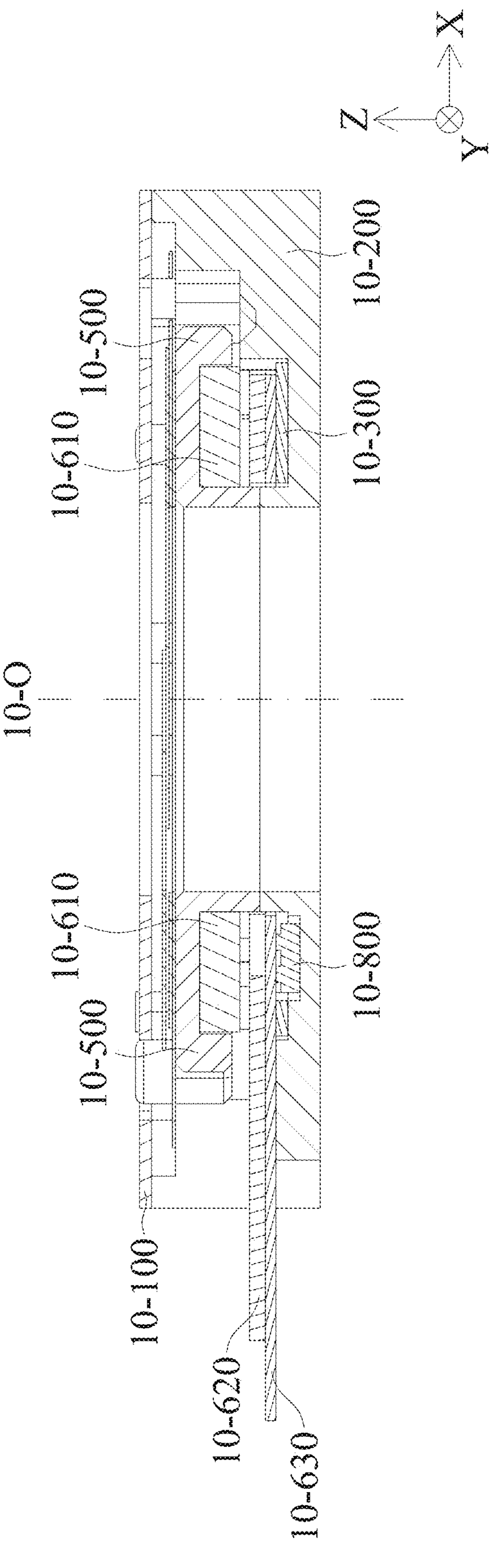
FIG. 3 is a cross sectional view illustrated along the line 10-A-10-A' of FIG. 1.

Firstly, referring to FIGS. 1, 2 and 3, which are a perspective view, an exploded view and a cross sectional view illustrated along a line 10-A-10-A' in FIG. 1 of an aperture unit 10-1, according to some embodiments of the present disclosure. The aperture unit 10-1 mainly includes a top plate 10-100, a bottom 10-200, a bottom plate 10-300 and other elements disposed between the top plate 10-100, the bottom 10-200 and the bottom plate 10-300. For example, in FIG. 2, an aperture 10-400 (includes two first blades 10-410 and two second blades 10-420), a guiding element 10-500, a driving assembly 10-600 (includes a magnetic element 10-610, a driving substrate 10-620 and a circuit board 10-630), sliding elements 10-700 and a sensor 10-800 are disposed between the top plate 10-100, the bottom 10-200 and the bottom plate 10-300.

The top plate 10-100, the bottom 10-200 and the bottom plate 10-300 may be combined with each other to form a case of the aperture unit 10-1. It should be noted that a top plate opening 10-110, a bottom opening 10-210 and a bottom plate opening 10-310 are formed on the top plate 10-100, the bottom 10-200 and the bottom plate 10-300, respectively. The centers of the top plate opening 10-110, the bottom opening 10-210 and the bottom plate opening 10-310 correspond to an optical axis 10-O of the aperture unit 10-1.

In some embodiments, the top plate 10-100, the bottom 10-200 and the bottom plate 10-300 may be made of nonconductive materials (e.g. plastic), so the short circuit or electrical interference between the aperture unit 10-1 and other electronic elements around may be prevented. In some embodiments, the top plate 10-100, the bottom 10-200 and the bottom plate 10-300 may be made of metal to enhance the mechanical strength of the top plate 10-100, the bottom 10-200 and the bottom plate 10-300.

The aperture 10-400, the guiding element 10-500 and the driving assembly 10-600 may be disposed between the top plate 10-100 and the bottom 10-200 in order. In other words, the driving assembly 10-600 is disposed between the guiding element 10-500 and the bottom 10-200. In the aperture 10-400, the two first blades 10-410 are arranged in a first direction (the X or Y direction), the two second blades 10-420 are arranged in a second direction (the Y or X direction), and the first direction and the second direction are different, such as perpendicular to each other. Furthermore, the two first blades 10-410 are positioned on different XY planes, and the two second blades 10-420 are also positioned on different XY planes. As a result, the first blades 10-410 and the second blades 10-420 are allowed to partially overlap along the optical axis, and the friction between the blades may be reduced.

In some embodiments, the portions that do not move, such as the top plate 10-100, the bottom 10-200 and the bottom plate 10-300, may be defined as fixed portions, and the portions that may move relative to the fixed portions may be defined as movable portions, such as the guiding element 10-500, etc. The sliding elements 10-700, such as balls, may be disposed between the guiding element 10-500 and the bottom 10-200 (fixed portion) to allow the guiding element 10-500 (movable portion) sliding relative to the bottom 10-200 (fixed portion).

The sensor 10-800 may be used to detect the positions of the elements in the aperture unit 10-1. The sensor 10-800 may be suitable position sensors such as Hall, MR (Magneto Resistance), GMR (Giant Magneto Resistance), or TMR (Tunneling Magneto Resistance) sensors. Furthermore, an initial position limiting assembly (not shown) such as a spring or a magnetic element maybe disposed in the aperture unit 10-1, when the driving assembly 10-600 does not drive the guiding element 10-500, the guiding element 10-500 may be positioned at a predetermined position relative to the fixed portion by the initial position limiting assembly.

Figure 4A:
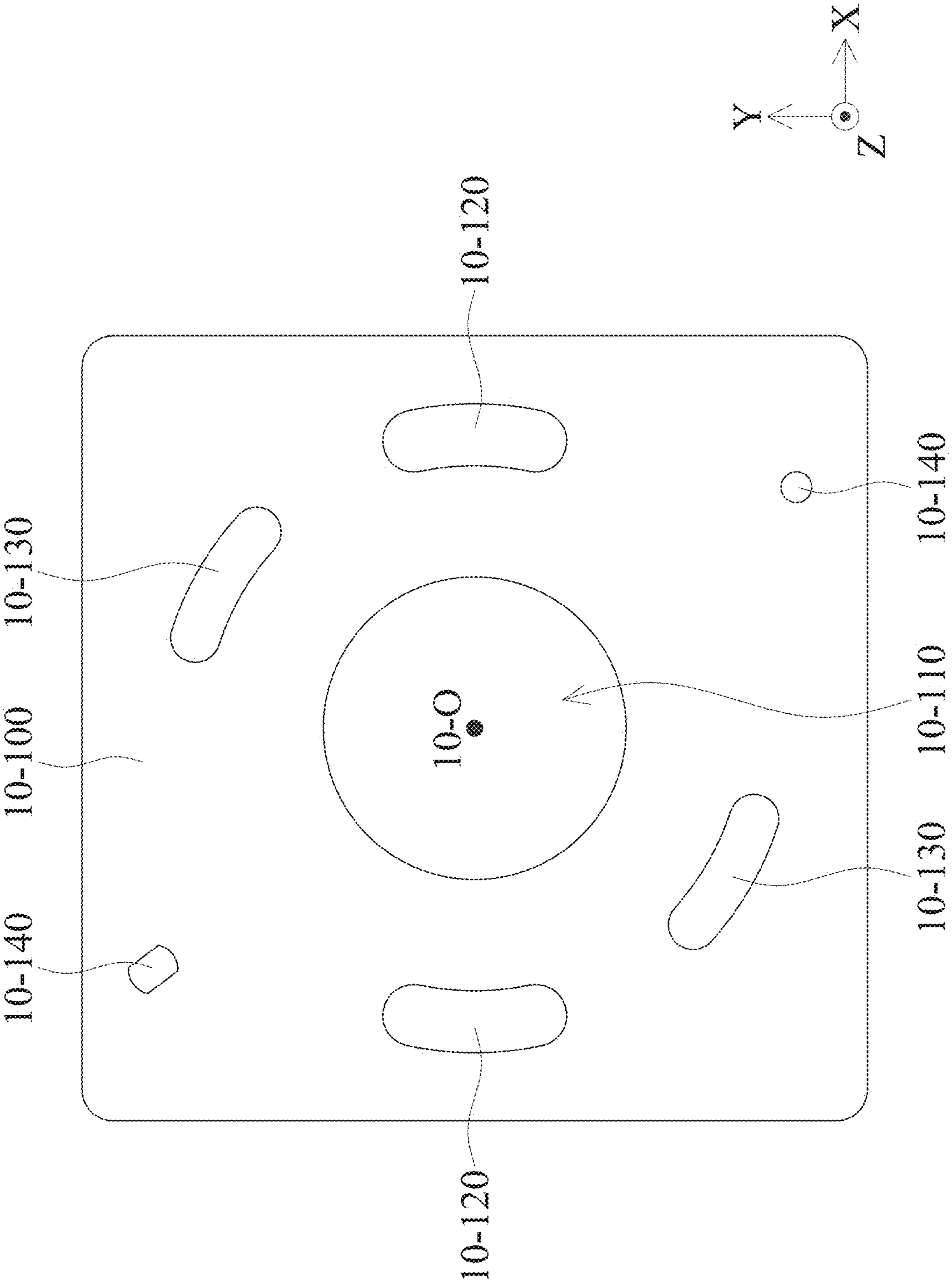
FIG. 4A is a schematic view of the top plate in FIG. 1.

FIG. 4A is a top view of the top plate 10-100. The top plate 10-100 includes a top plate opening 10-110, and two first top plate recesses 10-120 and two second top plate recesses 10-130 surrounding the top plate opening 10-110. Furthermore, two positioning holes 10-140 are formed on the top plate 10-100. In some embodiments, the two first top plate recesses 10-120 may be symmetric relative to the optical axis 10-O, and the two second top plate recesses 10-130 may also be symmetric relative to the optical axis 10-O, but the present disclosure is not limited thereto. Furthermore, in some embodiments, the width of the first top plate recess 10-120 is different than the width of the second top plate recess 10-130. Accordingly, elements disposed in the first top plate recess 10-120 and the second top plate recess 10-130 may have different sizes to increase design flexibility.

Figure 4B:
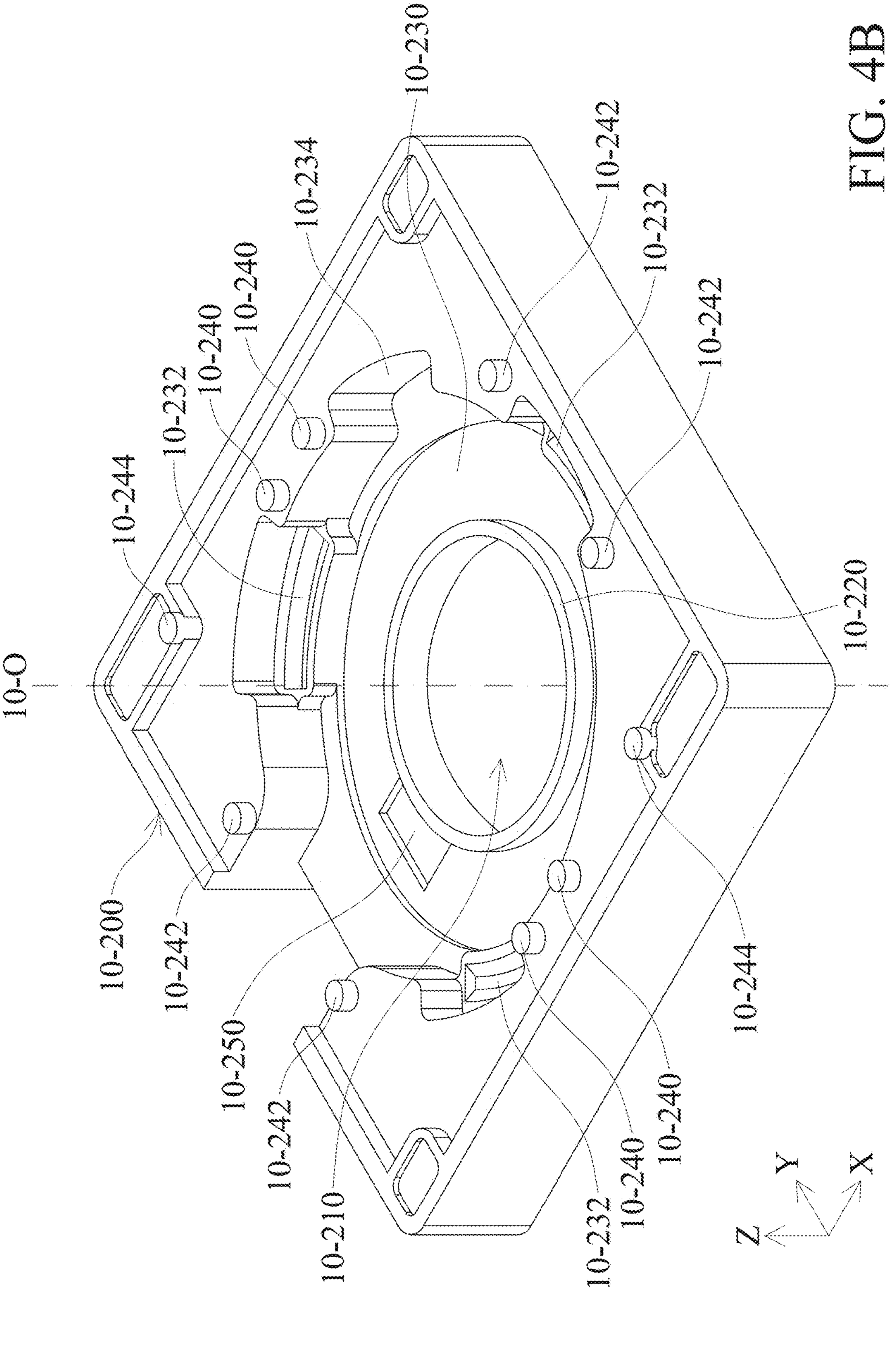
FIG. 4B is a schematic view of the bottom in FIG. 1.

FIG. 4B is a schematic view of the bottom 10-200. The bottom 10-200 includes a bottom opening 10-210, a protective structure 10-220 and a recess 10-230 surrounding the bottom opening 10-210, a plurality of guiding grooves 10-232, a positioning recess 10-234, a plurality of protrusions 10-240, protrusions 10-242 and positioning columns 10-244 and a concave portion 10-250 in the recess 10-230.

The bottom opening 10-210 is surrounded by the protective structure 10-220, and the protective structure 10-220 extends along the optical axis 10-O. Accordingly, dust from external may be prevented from entering the aperture unit 10-1, or fragment that may be created during the operation of the aperture unit 10-1 may be prevented from falling out from the aperture unit 10-1 to affect other elements (such as other elements in an image capturing device). The bottom opening 10-210 and the protective structure 10-220 are surrounded by the recess 10-230. Other elements, such as the driving assembly 10-600, may be disposed in the recess 10-230 to fix the position of the elements and protect these elements. A plurality of guiding grooves 10-232 and a positioning recess 10-234 may be formed on the bottom 10-200, wherein the guiding grooves 10-232 may be arranged in a rotational symmetric way relative to the optical axis 10-O, and the positioning recess 10-234 may be disposed between two guiding grooves 10-232.

Furthermore, a plurality of protrusions 10-240, protrusions 10-242 and positioning columns 10-244 extended along the optical axis 10-O (or toward the first blade 10-410) are formed on the bottom 10-200. The positions of the positioning columns 10-244 correspond to the positioning holes 10-140 of the top plate 10-100 (FIG. 4A) along the optical axis 10-O to allow the relative position between the top plate 10-100 and the bottom 10-200 being fixed.

In this embodiment, the protrusions 10-240, the protrusions 10-242 and the positioning columns 10-244 may be arranged symmetrically relative to the optical axis 10-O to balance the stress in the aperture unit 10-1. However, the present disclosure is not limited thereto. For example, the positions of the protrusions 10-240, the protrusions 10-242 and the positioning columns 10-244 may be changed. In some embodiments, the sensor 10-800 may be disposed in the concave portion 10-250 to fix the position of the sensor 10-800, but the present disclosure is not limited thereto. For example, the sensor 10-800 may be disposed at other suitable positions to meet desired requirements.

Figure 4C:
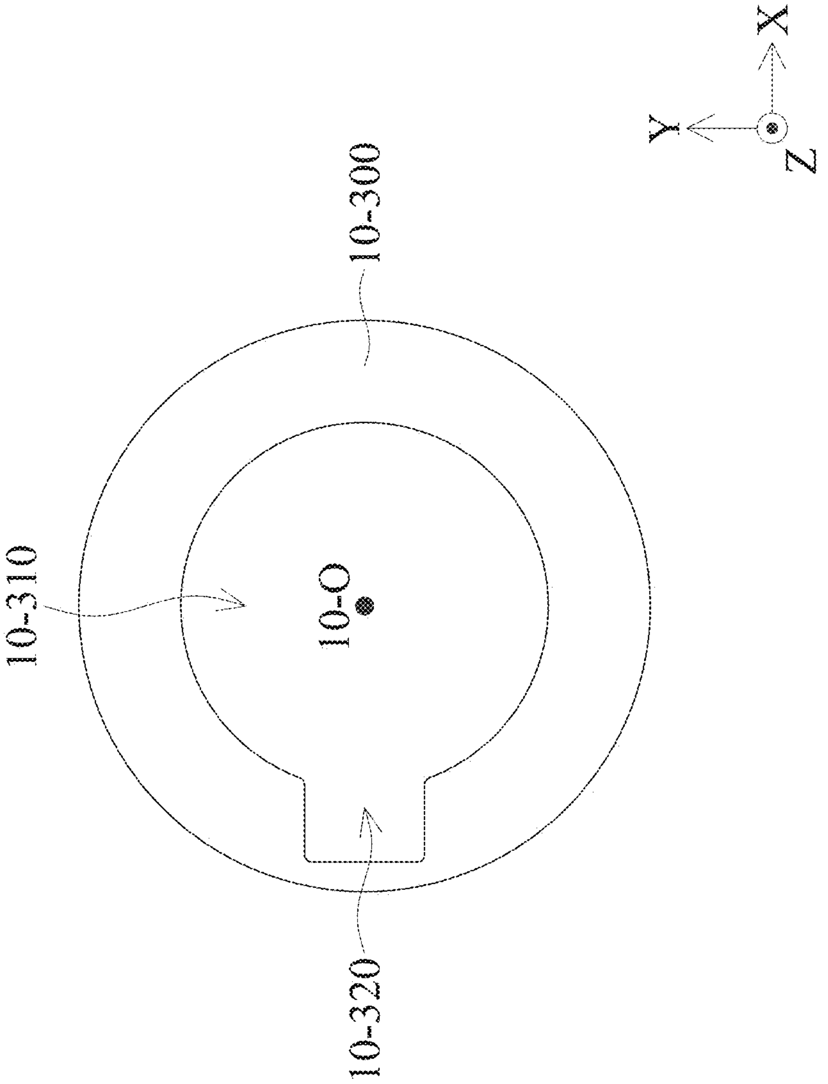
FIG. 4C is a schematic view of the bottom plate in FIG. 1.

FIG. 4C is a schematic view of the bottom plate 10-300. A bottom plate opening 10-310 is formed in the bottom plate 10-300, a concave structure 10-320 is formed on one side of the bottom plate opening 10-310 and corresponds to the concave portion 10-250 of the bottom 10-200 in FIG. 4B. Therefore, the sensor 10-800 is allowed to be disposed in the concave structure 10-320.

Figure 4D:
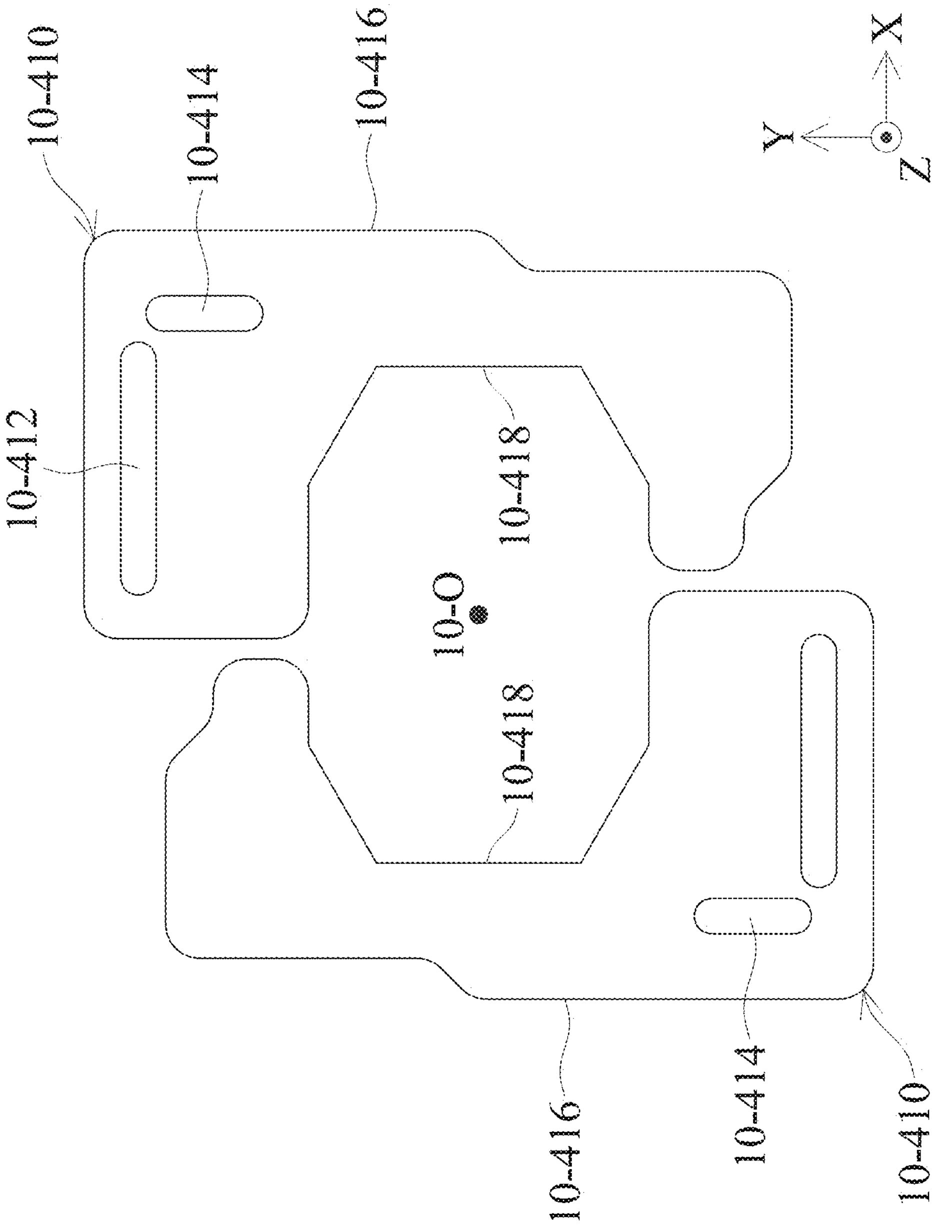
FIG. 4D is a schematic view of the first blade in FIG. 1.

FIG. 4D is a top view of two first blades 10-410. The first blades 10-410 have a shape like a plate. The first blade 10-410 includes a first trench 10-412 extended substantially in the X direction and a second trench 10-414 extended substantially to the Y direction. In other words, the first trench 10-412 and the second trench 10-414 extend in different directions. In some embodiments, the length of the first trench 10-412 is different than the second trench 10-414. For example, the length of the first trench 10-412 may be greater than the second trench 10-414. In other embodiments, the length of the first trench 10-412 may be less than the second trench 10-414.

Furthermore, the first blade 10-410 further includes an outer edge 10-416 and a first window edge 10-418. In this embodiment, the outer edge 10-416 faces away from the optical axis 10-O, and the first window edge 10-418 faces toward the optical axis 10-O. In other words, the distance between the outer edge 10-416 and the optical axis 10-O is greater than the distance between the first window edge 10-418 and the optical axis 10-O. Furthermore, the outer edge 10-416 does not have right angle. Because the outer edge 10-416 may contact other elements, if the outer edge 10-416 does not have right angle, the chance of damage caused by the outer edge 10-416 contacting with other elements may be reduced.

Figure 4E:
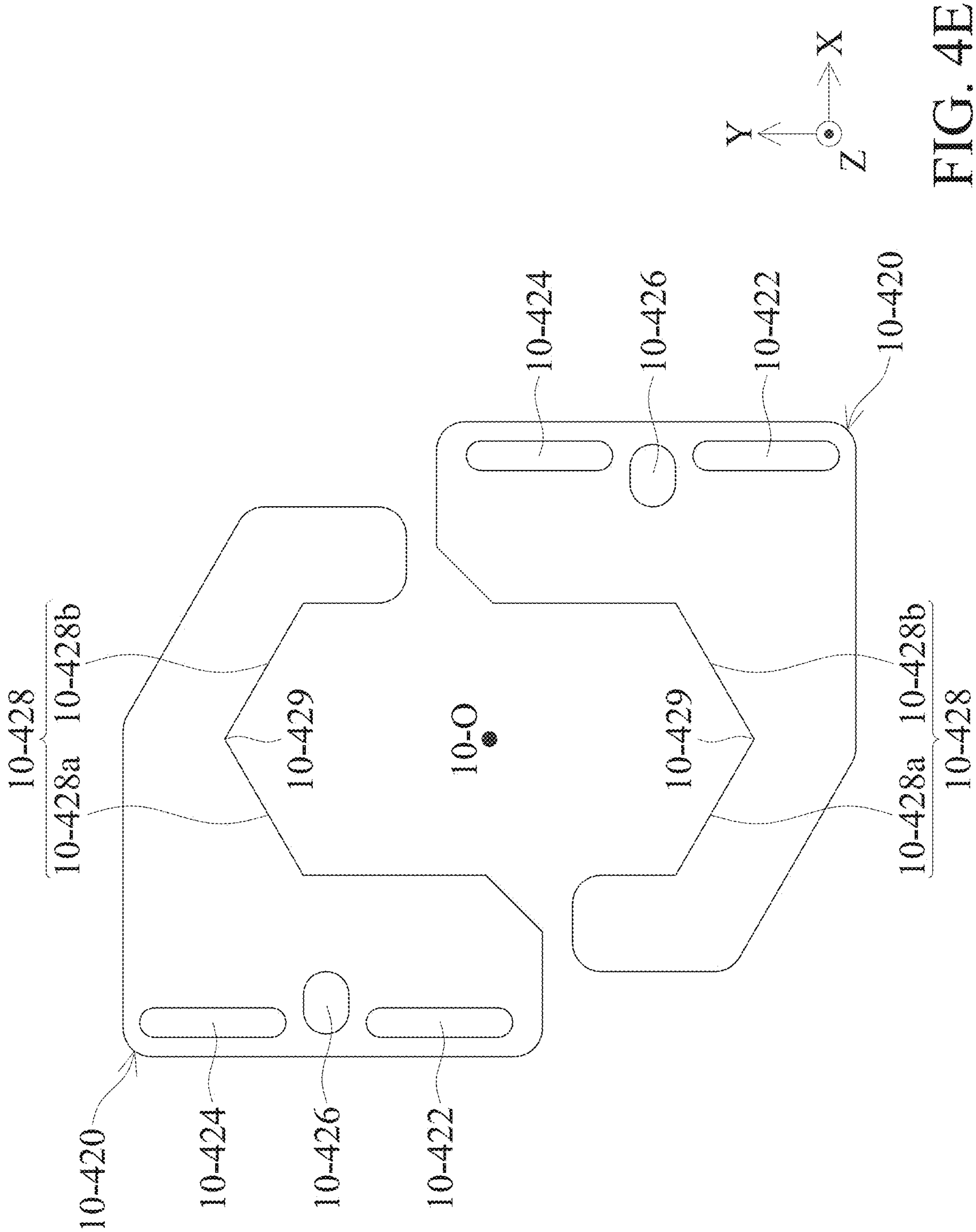
FIG. 4E is a schematic view of the second blade in FIG. 1.

Two second blades 10-420 are illustrated in FIG. 4E and have a shape like a plate. The second blade 10-420 includes a third trench 10-422 and a fourth trench 10-424 substantially extended in the same direction, such as extended in the Y direction, and a hole 10-426 is formed between the third trench 10-422 and the fourth trench 10-424. A V-shaped second window edge 10-428 (including an edge 10-428*a* and an edge 10-428*b*) is formed on one side of the second blade 10-420 facing the optical axis 10-O. In other words, the edge 10-428*a* and the edge 10-428*b* extend in different directions. Furthermore, the intersection of the edge 10-428*a* and the edge 10-428*b* is called an intersection 10-429.

Figure 4F:
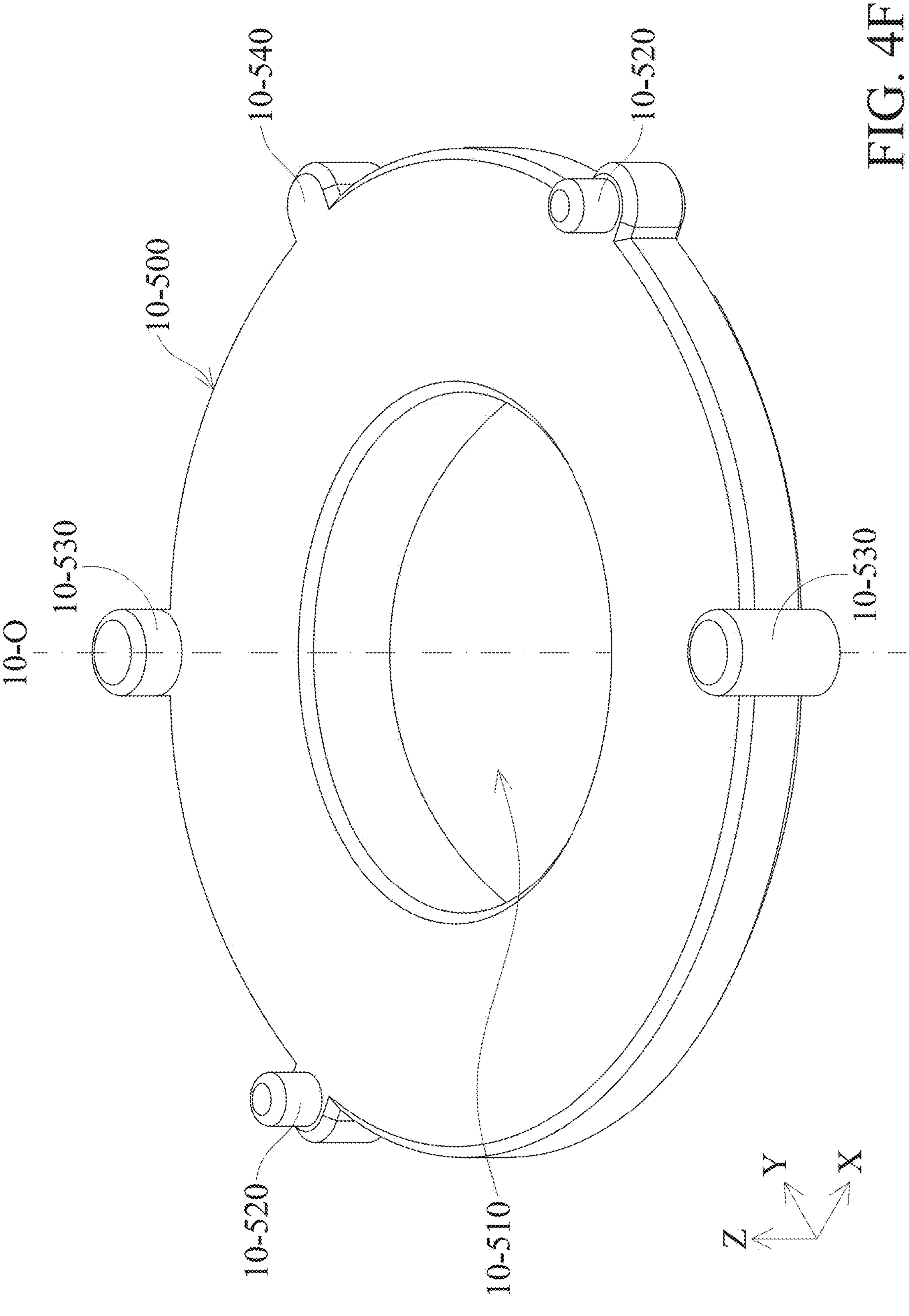
FIG. 4F is a schematic view of the guiding element in FIG. 1.
Figure 4G:
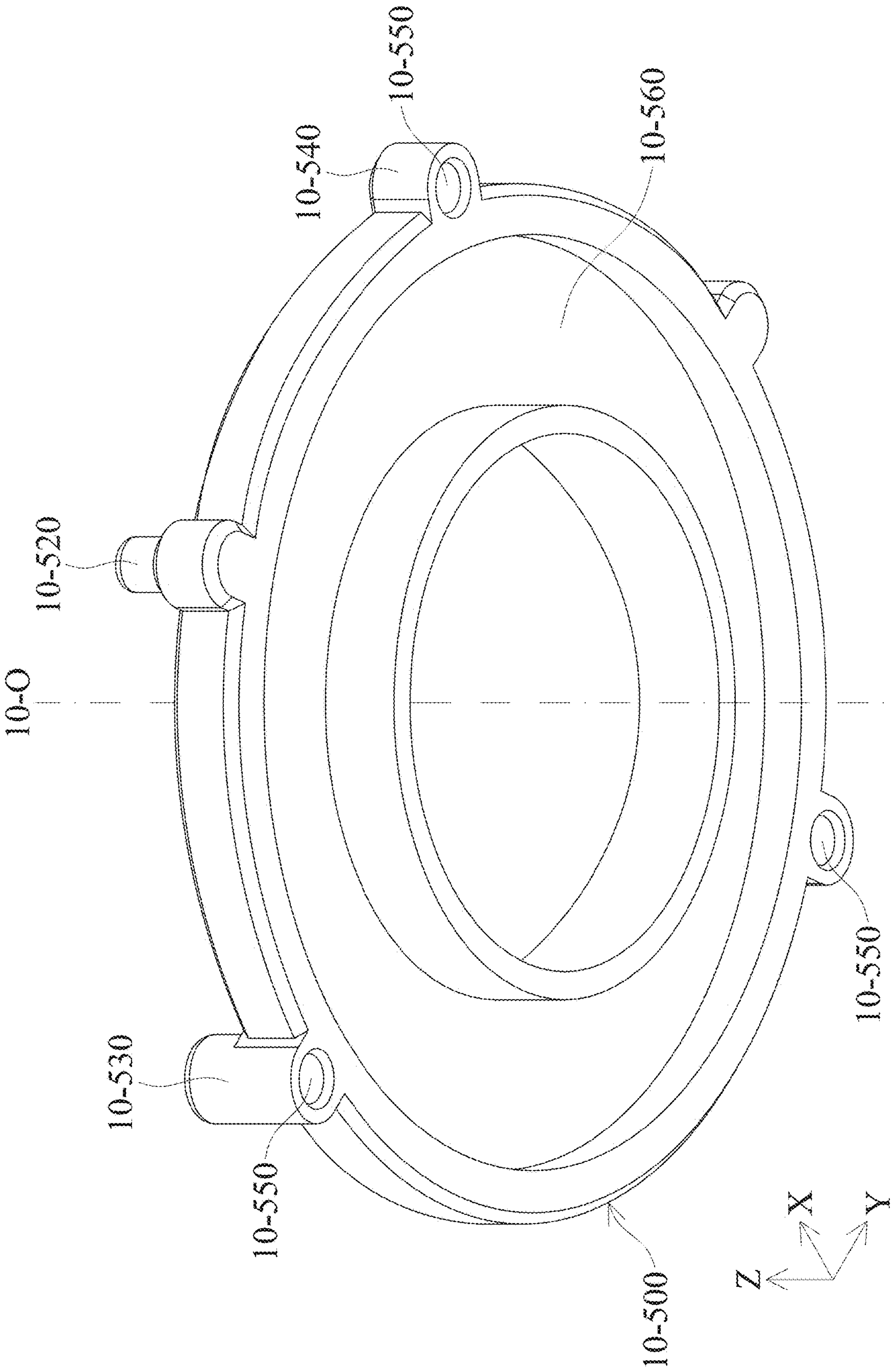
FIG. 4G is a schematic view of the guiding element in FIG. 1.

FIGS. 4F and 4G are schematic views of the guiding element 10-500 viewed from different directions. A guiding element opening 10-510 is formed in the guiding element 10-500. Two first columns 10-520, two second columns 10-530 and a positioning portion 10-540 are formed at the outer side (the side faces opposite to the optical axis 10-O) of the guiding element 10-500. The first columns 10-520 and the second columns 10-530 positioned on one side of the guiding element 10-500 that extends toward the first blade 10-410 (the Z direction) along the optical axis 10-O, and concave portions 10-550 and a recess 10-560 are formed on another side of the guiding element 10-500 (the −Z direction, please refer to FIG. 4G). In some embodiments, the concave portions 10-550 may be positioned under the second columns 10-530 and the positioning portion 10-540, and may have a shape corresponding to the sliding elements 10-700, but the present disclosure is not limited thereto. For example, in some embodiments, the concave portions may be formed under the first columns 10-520. The guiding element opening 10-510 is surrounded by the recess 10-560, and the recess 10-560 may have a shape corresponded to the magnetic element 10-610 to allow the magnetic element 10-610 being disposed in the recess 10-560. As a result, the position of the magnetic element 10-610 may be fixed by, for example, adhering, and the magnetic element 10-610 may be allowed to move together with the guiding element 10-500.

Figure 4H:
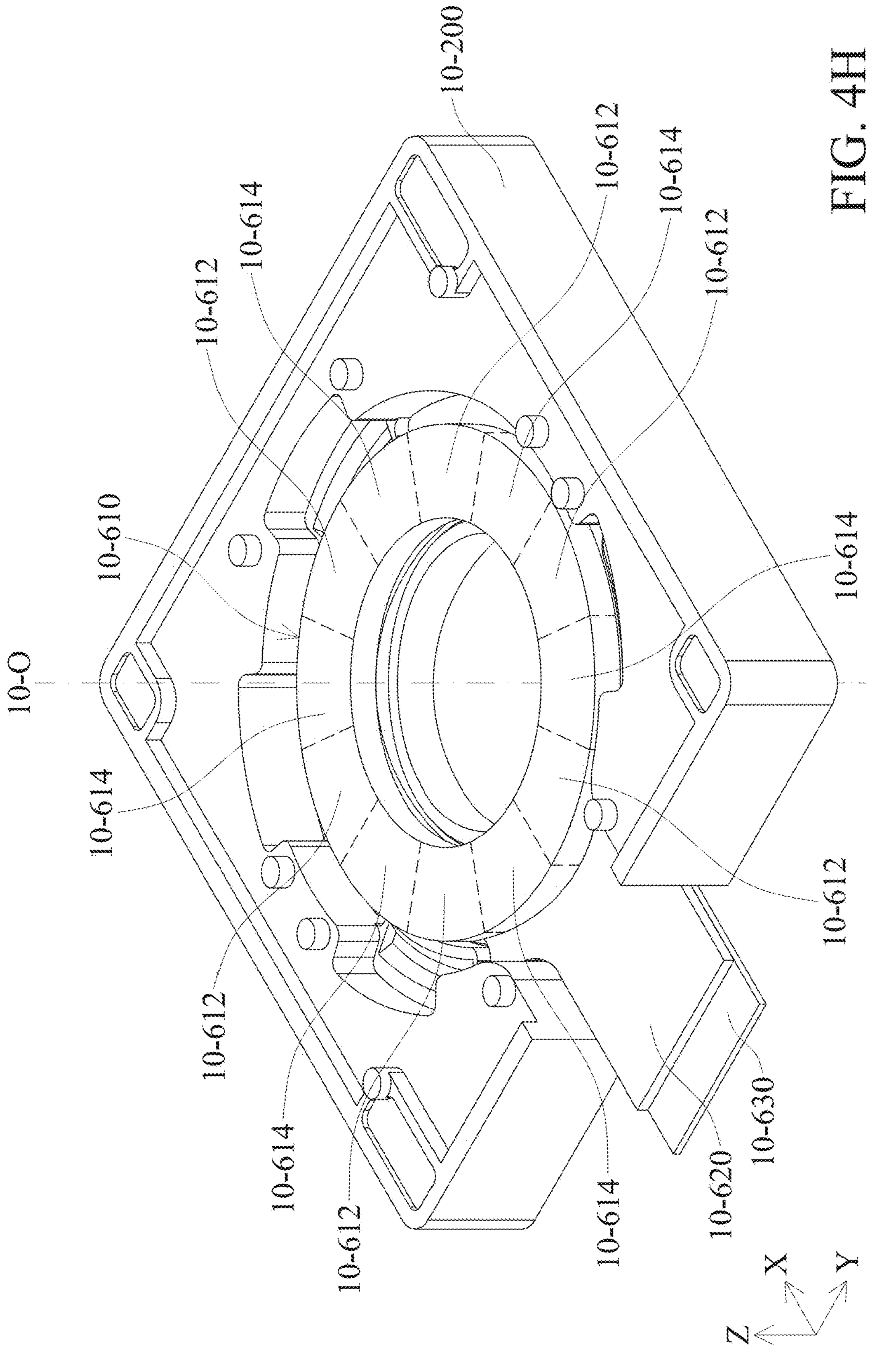
FIG. 4H is a schematic view of some elements in FIG. 1.

FIG. 4H is a schematic view of the bottom 10-200 and the driving assembly 10-600 (includes the magnetic element 10-610, the driving substrate 10-620 and the circuit board 10-630). In FIG. 4H, the circuit board 10-630 is disposed in the recess 10-230 of the bottom 10-200 (FIG. 4B), the driving substrate 10-620 is disposed on the circuit board 10-630, and the magnetic element 10-610 is disposed on the driving substrate 10-620. The circuit board 10-630 may be, for example, a flexible printing circuit (FPC), and may be affixed on the bottom 10-200 by adhering to be electrically connected to other elements outside the aperture unit 10-1 and may provide electrical signal to other elements of the aperture unit 10-1.

The magnetic element 10-610 may be, for example, a magnet, and may have a plurality of first magnetic poles 10-612 and second magnetic poles 10-614 arranged in turn and surrounding the optical axis 10-O, as shown by the dashed lines in FIG. 4H. The driving substrate 10-620 may include a coil corresponding to the magnetic element 10-610, such as a flat plate coil. Accordingly, an electromagnetic driving force may be created by the interaction between the magnetic element 10-610 and the driving substrate 10-620 to move the magnetic element 10-610 in clockwise or counterclockwise directions relative to the optical axis 10-O (i.e. first moving dimension).

The magnetic element 10-610 is disposed and fixed in the recess 10-560 of the guiding element 10-500 (FIG. 4G), so the magnetic element 10-610 may drive the guiding element 10-500 to rotate together in clockwise or counterclockwise direction (i.e. the first moving dimension). Furthermore, the sensor 10-800 is disposed in the concave portion 10-250 of the bottom 10-200, and the driving substrate 10-620 is disposed on the sensor 10-800, so the minimum distance between the driving substrate 10-620 and the guiding element 10-500 may be less than the minimum distance between the sensor 10-800 and the guiding element 10-500, and the driving substrate 10-620 may protect the sensor 10-800 disposed under the driving substrate 10-620 by prevent the sensor 10-800 colliding with other elements. Furthermore, the driving assembly 10-600 is disposed in the recess 10-230 of the bottom 10-200, and the protective structure 10-220 is extended along the Z direction from the recess 10-230, so at least a portion of the protective structure 10-220 of the bottom 10-200 may overlap the driving assembly 10-600 when viewed in a direction that is perpendicular to the optical axis 10-O.

Figure 5A:
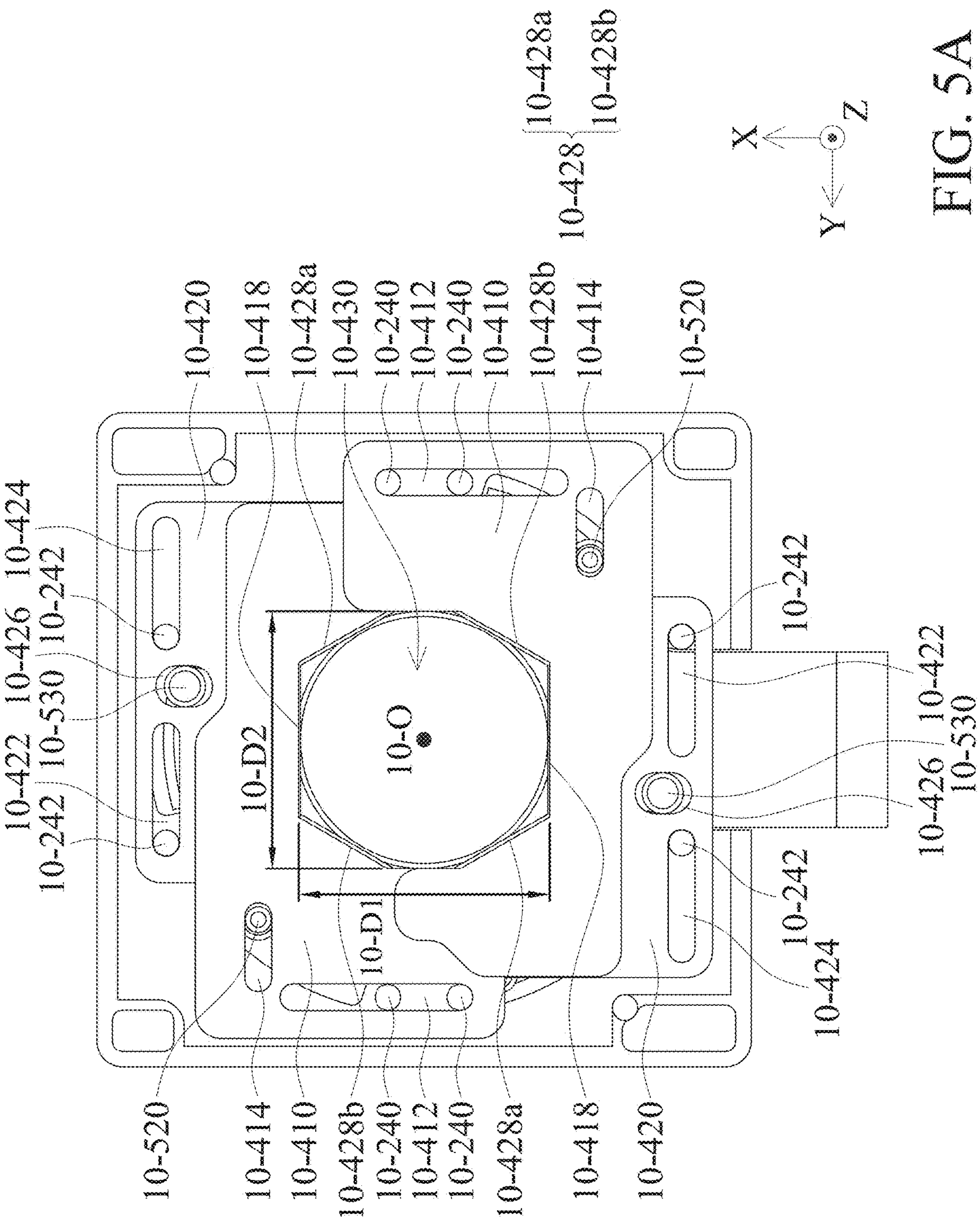
FIG. 5A is a schematic view of some elements in FIG. 1 under one condition.

FIG. 5A is a schematic view of some elements of the aperture unit 10-1 under one condition. It should be noted that the protrusions 10-240 of the bottom 10-200 are disposed in the first trenches 10-412 of the first blades 10-410, and the protrusions 10-242 of the bottom 10-200 are disposed in the third trenches 10-422 and the fourth trenches 10-424 of the second blades 10-420. The first columns 10-520 of the guiding element 10-500 are disposed in the second trenches 10-414 of the first blades 10-410, and the second columns 10-530 of the guiding element 10-500 are disposed in the holes 10-426 of the second blades 10-420. In other words, the first blades 10-410 and the second blades 10-420 contact and are slidably connected to the bottom 10-200 (the fixed portion) and the guiding element 10-500 by different portions. Furthermore, the first blades 10-410 and the second blades 10-420 are positioned on different planes. For example, the distance between the first blades 10-410 and the circuit board 10-630 is greater than the distance between the second blades 10-420 and the circuit board 10-630.

It should be noted than in FIG. 5A, the first trench 10-412 of the first blade 10-410 extends in the X direction, and the second trench 10-414 of the first blade 10-410, the third trench 10-422 and the fourth trench 10-424 of the second blade 10-420 extend in the Y direction. At the same time, the first window edge 10-418 of the first blade 10-410 and the second window edge 10-428 of the second blade 10-420 form a window 10-430, and the size of the window 10-430 in the X direction is distance 10-D1 (the distance between the two first window edges 10-418), and the size of the window 10-430 in the Y direction is distance 10-D2. Furthermore, at least a portion of the first blade 10-410 overlaps the second blade 10-420 when viewed along the optical axis 10-O. For example, the first blade 10-410 may overlap the second blade 10-420 by the outer edge 10-416 in FIG. 4D. Accordingly, it can be ensured that the first blade 10-410 and the second blade 10-420 form the window 10-430.

Figure 5B:
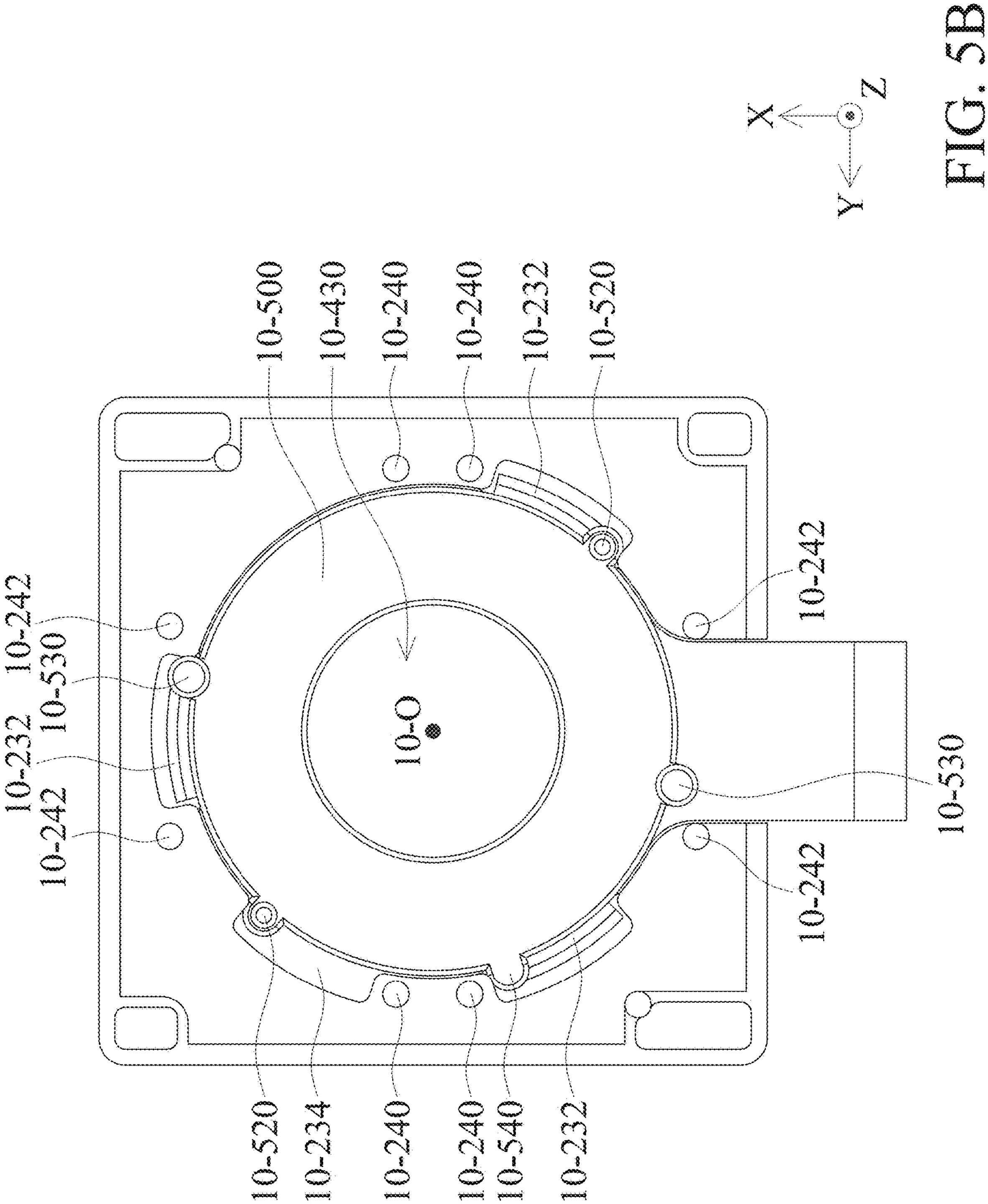
FIG. 5B is a schematic view of some elements in FIG. 1 under one condition.

FIG. 5B is a schematic view of the bottom 10-200, the guiding element 10-500 and the driving assembly 10-600 (includes the magnetic element 10-610, the driving substrate 10-620 and the circuit board 10-630) under the condition illustrated in FIG. 5A. The first columns 10-520, the second columns 10-530 and the positioning portion 10-540 are positioned in the guiding grooves 10-232 or the positioning recess 10-234 of the bottom 10-200. It should be noted that the sliding elements 10-700 (FIG. 2) are positioned between the bottom 10-200 and the first columns 10-520, the second columns 10-530 and the positioning position 10-540 to allow the guiding element 10-500 sliding relative to the bottom 10-200. The sliding element 10-700 is disposed in the concave portion 10-550 of the guiding element 10-500, so the relative positions between the guiding element 10-500 and the sliding element 10-700 may be fixed when the guiding element 10-500 is rotated, and the sliding element 10-700 slidably contacts the bottom 10-200 (fixed portion). Furthermore, the first column 10-520, the second column 10-530 and the positioning portion 10-540 are positioned at one side of the guiding groove 10-232 or the positioning recess 10-234, so the rotation direction of the guiding element 10-500 may be limited. For example, under the condition illustrated in FIG. 5B, the guiding element 10-500 cannot be rotated in the clockwise direction.

Figure 6A:
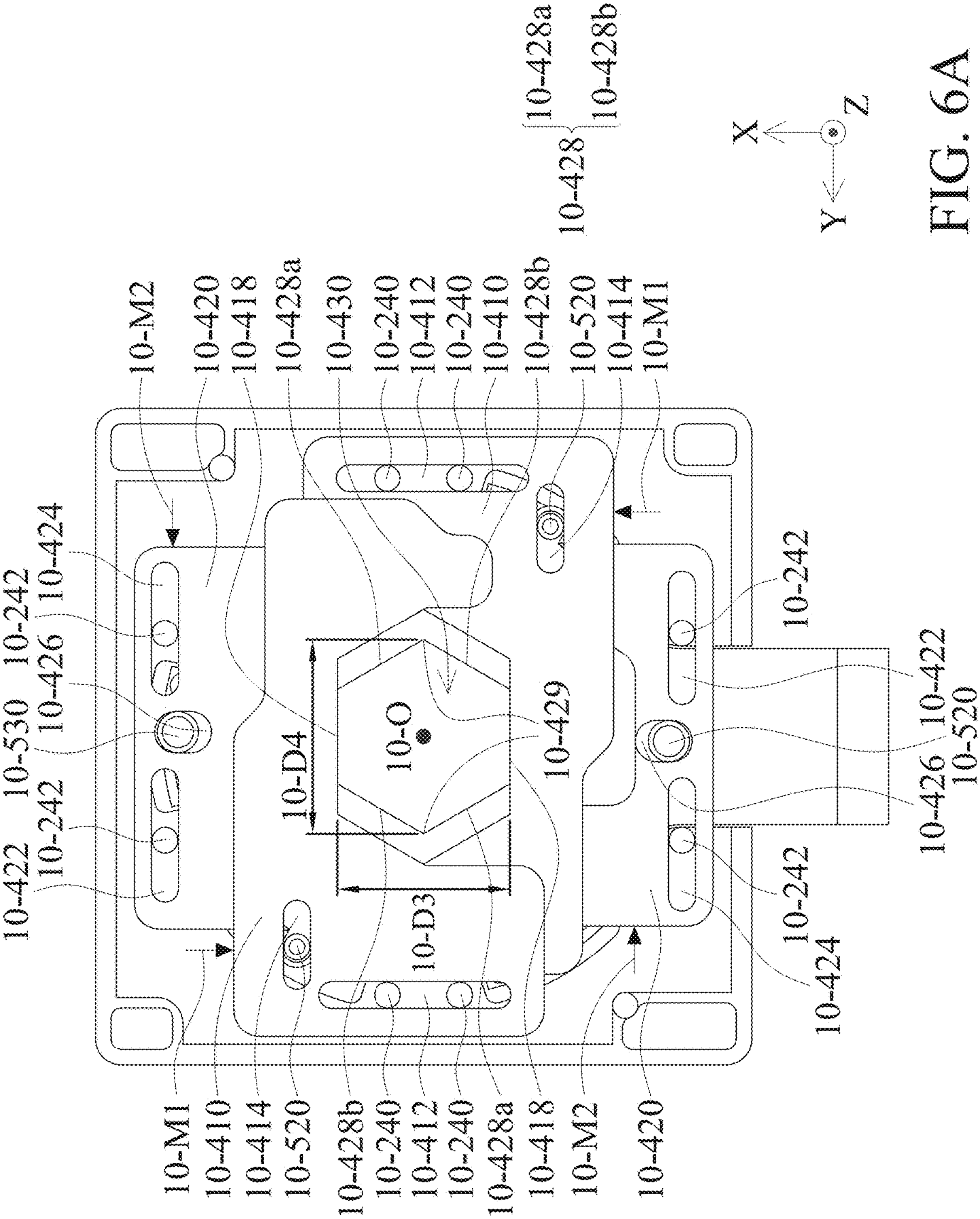
FIG. 6A is a schematic view of some elements in FIG. 1 under another condition.
Figure 6B:
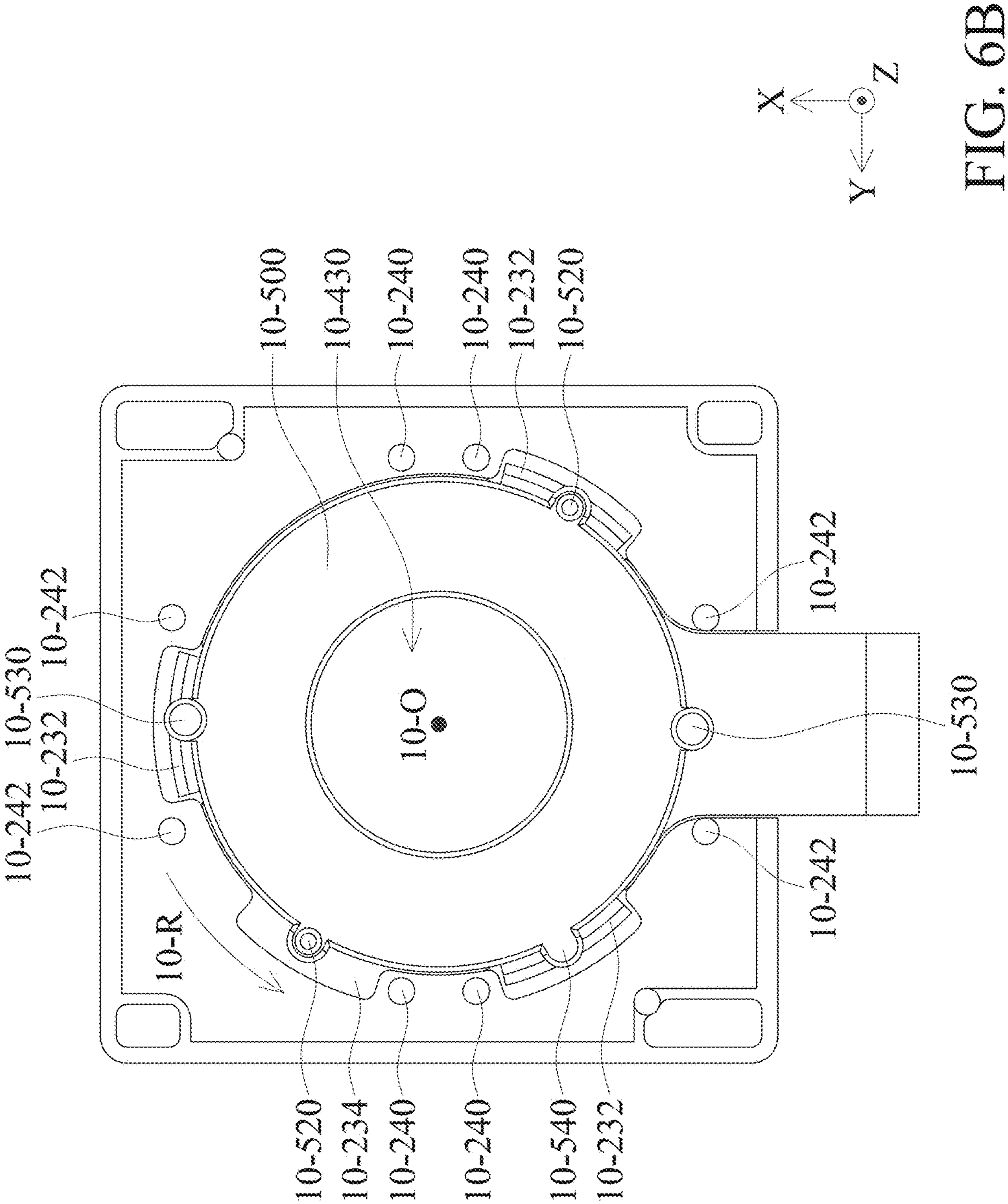
FIG. 6B is a schematic view of some elements in FIG. 1 under another condition.

FIGS. 6A and 6B are schematic views of some elements of the aperture unit 10-1 under another condition, wherein an electromagnetic driving force created between the coil in the driving substrate 10-620 and the magnetic element 10-610 drives the guiding element 10-500 to be rotated, as shown by the rotation direction 10-R in FIG. 6B.

As a result, referring to FIG. 6A, the first blade 10-410 and the second blade 10-420 may be moved together due to the rotation of the guiding element 10-500. For example, in FIG. 6A, when the first column 10-520 of the guiding element 10-500 is rotated, the second trench 10-414 of the first blade 10-410 may be pushed, and the protrusions 10-240 on the bottom 10-200 and the first trench 10-212 of the first blade 10-410 may limit the moving direction of the first blade 10-410. The two protrusions 10-240 on the bottom 10-200 are arranged in the X direction, so the two first blades 10-410 may move in the X direction (second moving dimension) relative to the bottom 10-200 (fixed portion) and becoming closer to each other, as shown by the moving direction 10-M1. It should be noted that the second moving dimension (the lateral movement in the X direction) is different than the first moving dimension (the rotational movement relative to the optical axis 10-O).

Furthermore, the protrusions 10-240 are arranged in a direction that is parallel to the second moving dimension, and the first trench 10-412 extends in a direction that is parallel to the second moving dimension. In other words, the distance between the two first window edges 10-418 of the two first blades 10-410 is 10-D3 under this condition, the distance between the two first window edges 10-418 of the two first blades 10-410 is 10-D1 under the aforementioned condition, and the distance 10-D3 is less than the distance 10-D1.

Similarly, the holes 10-426 of the second blades 10-420 may be pushed by the second columns 10-530 of the guiding element 10-500 when the guiding element 10-500 is rotating, and the rotation direction may be limited by the protrusions 10-242 of the bottom 10-200 and the third trenches 10-422 and the fourth trenches 10-424 of the second blades 10-420. For example, the two protrusions 10-242 of the bottom 10-200 may be arranged in the Y direction, so the two second blades 10-420 may move in the Y direction (the third moving dimension) relative to the bottom 10-200 (fixed portion) and become closer to each other, as shown by the moving direction 10-M2. The third moving dimension (translational movement in the Y direction) is different than the first moving dimension (rotational movement relative to the optical axis 10-O) and the second moving dimension (translational movement in the X direction). In other words, the distance between two intersections 10-429 of the second window edges 10-428 of two second blades 10-420 is 10-D4, and the distance 10-D4 is less than the distance 10-D2 between the two second window edges 10-428 of the two second blades 10-420 illustrated in the aforementioned condition.

It should be noted that the moving distances of the first blades 10-410 and the second blades 10-420 in FIGS. 6A and 6B are different to the condition illustrated in FIGS. 5A and 5B. In other words, the distance 10-D1 minus the distance 10-D3 is different than the distance 10-D2 minus the distance 10-D4. In some embodiments, the distance 10-D1 minus the distance 10-D3 is less than the distance 10-D2 minus the distance 10-D4, i.e. (10-D1)−(10-D3)<(10-D2)−(10-D4).

It is because the window 10-430 formed by the first window edge 10-418 and the second window edge 10-428 has a hexagonal shape in this embodiment, and the distance between two opposite vertexes of a hexagon is different to two opposite edges of the hexagon. In other words, if it is desired to let the window 10-430 under different conditions being similar hexagons, the first blade 10-410 and the second blade 10-420 have to move different distances. If the hexagons are similar, this will improve the uniformity of the light that passes through different sizes of windows.

It should be noted that a portion of the aperture unit 10-1 forms a first moving connecting portion, such as the first trench 10-412 of the first blade 10-410 and the protrusion 10-240 of the bottom 10-200, or the third trench 10-422 of the second blade 10-420 and the protrusion 10-242 of the bottom 10-200, etc., but the present disclosure does not limited thereto. Another portion of the aperture unit 10-1 forms a second moving connecting portion, such as the second trench 10-414 of the first blade 10-410 and the first column 10-520 of the guiding element 10-500, or the hole 10-426 of the second blade 10-420 and the second column 10-520 of the guiding element 10-500, but the present disclosure is not limited thereto. The first blade 10-410 or the second blade 10-420 contacts to and is movably connected to the bottom 10-200 (the fixed portion) in the first moving connecting portion, and the first blade 10-410 or the second blade 10-420 contacts and is slidably connected to the guiding element 10-500 in the second moving connecting portion.

In some embodiments, another portion of the aperture unit 10-1 forms another first moving connecting portion, such as the fourth trench 10-424 of the second blade 10-420 and the protrusion 10-242 of the bottom 10-200. Under this condition, the second blade 10-420 contacts and is slidably connected to the bottom 10-200 (the fixed portion) in another first moving connecting portion, and the second moving connecting portion is disposed between the two first moving connecting portions.

Figure 7A:
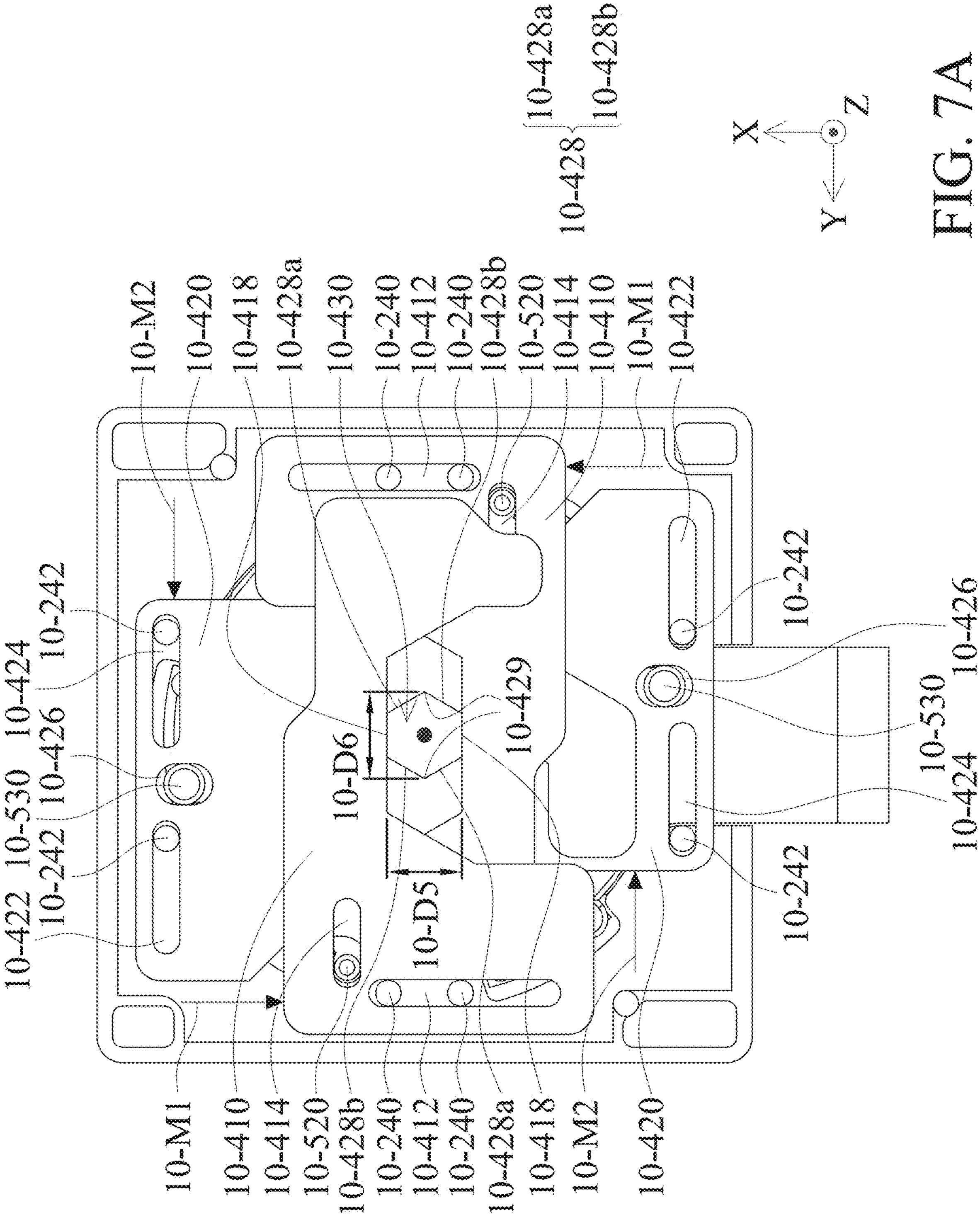
FIG. 7A is a schematic view of some elements in FIG. 1 under another condition.
Figure 7B:
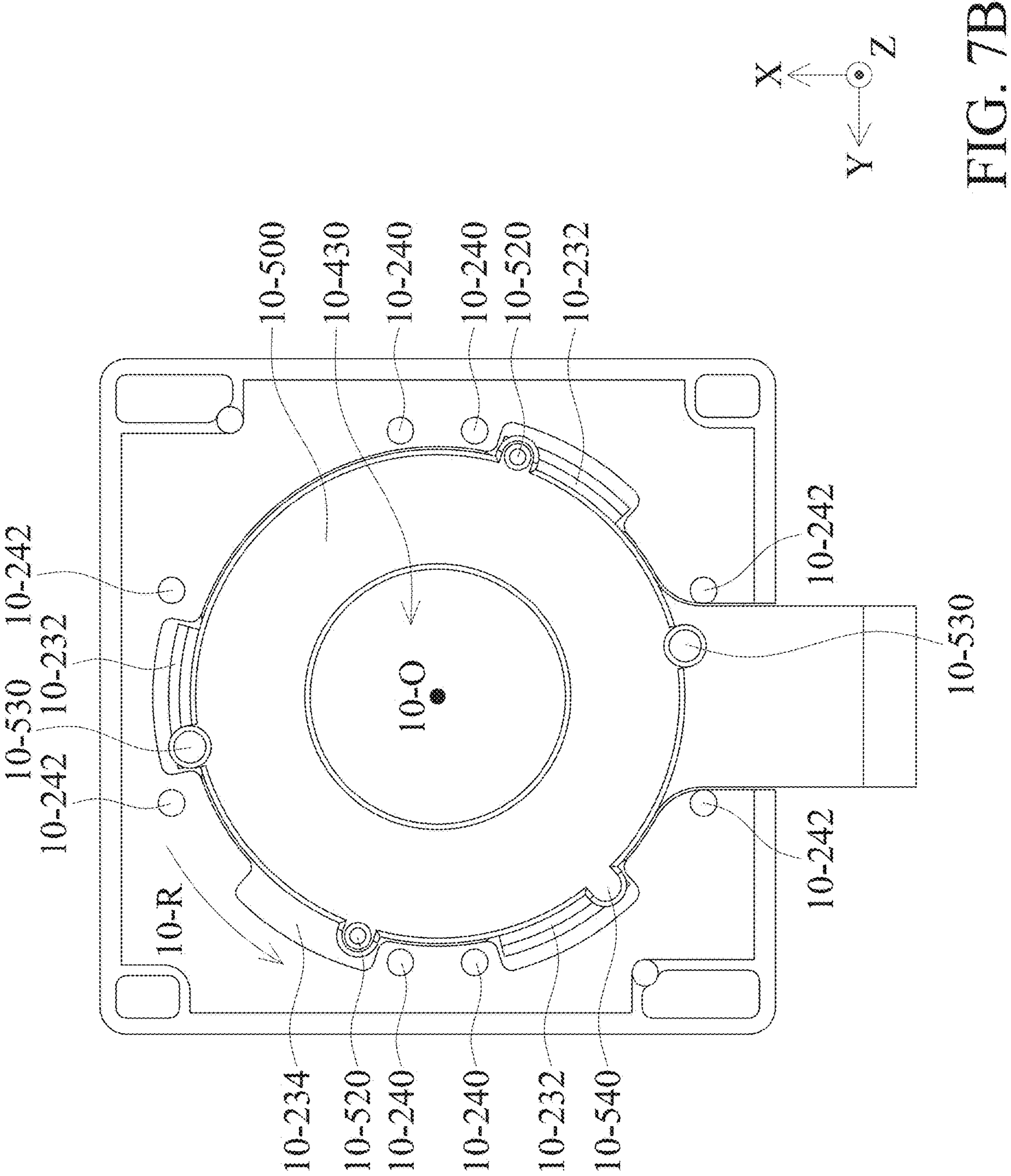
FIG. 7B is a schematic view of some elements in FIG. 1 under another condition.

FIGS. 7A and 7B are schematic view of some elements of the aperture unit 10-1 under another condition. Under this condition, the electromagnetic force created between the coil in the driving substrate 10-620 and the magnetic element 10-610 may drive the guiding element 10-500 to rotate further than the aforementioned condition, as shown by the rotation direction 10-R in FIG. 7B.

As a result, the two first blades 10-410 and the two second blades 10-420 may become closer to each other, and the size of the window 10-430 may be further decreased. Referring to FIG. 7A, the distance between two first window edges 10-418 of the two first blades 10-410 is 10-D5, and the distance 10-D5 is less than the distance 10-D3 between the two first window edges 10-418 of the two first blades 10-410 under the aforementioned condition. Furthermore, the distance between the two intersections 10-429 of the second window edges 10-428 of the two second blades 10-420 is 10-D6, and the distance 10-D6 is less than the distance 10-D4 between the second window edges 10-428 of the two second blades 10-420.

Similarly, the moving distances of the first blade 10-410 and the second blade 10-420 in FIGS. 7A and 7B are different to the condition illustrated in FIGS. 6A and 6B. In other words, the distance 10-D3 minus the distance 10-D5 is different than the distance 10-D4 minus the distance 10-D6. In some embodiments, the distance 10-D3 minus the distance 10-D5 is less than the distance 10-D4 minus the distance 10-D6, i.e. (10-D3)−(10-D5)<(10-D4)−(10-D6).

Accordingly, the first blade 10-410 may move in the second moving dimension (translational movement in the X direction) within a first range (i.e. the size of the window 10-430 in the X direction may be changed between 10-D1 and 10-D5), the second blade 10-420 may move in the third moving dimension (translational movement in the Y direction) within a second range (i.e. the size of the window 10-430 in the Y direction may be changed between 10-D2 and 10-D6), and the first range is different than the second range (i.e. 10-D1 minus 10-D5 is different than 10-D2 minus 10-D6). It should be noted that in the first range and the second range, at least a portion of the first blade 10-410 overlaps the second blade 10-420 to form the window 10-430.

If it is desired to enlarge the size of the window 10-430 of the aperture unit 10-1, an electromagnetic force having an opposite direction to the aforementioned embodiments should be applied to the guiding element 10-500 for rotating the guiding element 10-500 to a direction opposite to the rotation direction 10-R, and the first blade 10-410 and the second blade 10-420 may move in a direction opposite to the aforementioned embodiments to enlarge the size of the window 10-430.

Accordingly, the window 10-430 (equivalent aperture) of the aperture unit 10-1 may change continuously within the range to allow the aperture unit 10-1 having different aperture sizes to meet different image capturing requirements. In general, when the size of the equivalent aperture is enlarged, the incident light flux may also be increased, so this kind of aperture may be applied in an environment having low brightness. Furthermore, the influence of background noise may be decreased to avoid image noise. Moreover, the sharpness of the image received may be increased if the size of the equivalent aperture is decreased in a high-brightness environment, and overexposure may also be prevented.

Although the first moving dimension is rotational movement, and the second moving dimension and the third moving dimension are translational movements in different directions, the present disclosure is not limited thereto. As long as the first moving dimension, the second moving dimension and the third movement dimension are different, the desired result of the present disclosure may be achieved. Furthermore, the aperture unit 10-1 may be fixed to other external elements through the guiding element 10-500 and the fixed portion (such as the bottom 10-200) to move together with other external elements. As a result, no additional driving element should be provided, and miniaturization may be achieved.

The aperture unit 10-1 may be disposed in image capturing devices that require apertures. For example, the aperture unit 10-1 may be disposed in a periscope image capturing device to meet the thickness requirement of mobile electronic devices.

In summary, an aperture unit that can continuously control the size of the aperture opening is provided in the present disclosure. Accordingly, different user requirements of image capturing may be fulfilled. Furthermore, the aperture unit may be disposed on the movable portion and no additional driving element is required to drive the aperture unit, so that miniaturization may be achieved.

The embodiments in present disclosure have at least one of the advantages or effects that the optical driving mechanism has better focus function and optical compensation, and can protect the biasing assembly, to greatly reduce the damage or breakage caused by the collision during the movement. In some embodiments, the optical driving mechanism further includes a resin assembly and a vibration-damping assembly disposed on and in direct contact with the biasing element to provide a vibration-damping effect, thereby improving the quality of the driving mechanism.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An aperture unit having an optical axis, comprising:

a fixed portion comprising a sidewall, wherein the sidewall has a recessed portion having a recessed structure;

a guiding element movably connected to the fixed portion;

a first blade movably connected to the guiding element and the fixed portion;

a driving assembly used for driving the guiding element to move for moving the first blade; and a sliding element at least partially accommodated in the recessed portion, and the guiding element is movable relative to the fixed portion through the sliding element.

2. The aperture unit as claimed in claim 1, wherein the fixed portion has a first surface, a first recessed space having a recessed structure is formed on the first surface to accommodate the guiding element, and the sidewall is positioned at the first accommodating space and connects to the first surface.

3. The aperture unit as claimed in claim 1, wherein the fixed portion comprises a protrusion formed on the first surface and extending toward the first blade.

4. The aperture unit as claimed in claim 1, wherein the guiding element overlaps the sliding element when viewed along the optical axis.

5. The aperture unit as claimed in claim 4, wherein the sliding element does not exposed from the guiding element when viewed along the optical axis.

6. The aperture unit as claimed in claim 1, wherein the guiding element comprises a positioning portion overlapping the recessed portion when viewed along the optical axis.

7. The aperture unit as claimed in claim 6, wherein a concave portion is formed on the positioning portion, and the sliding element is partially disposed in the concave portion.

8. The aperture unit as claimed in claim 6, wherein the positioning portion does not pass through the first blade.

9. The aperture unit as claimed in claim 1, further comprising a sensor, wherein the fixed portion has a concave portion, and the sensor is disposed in the concave portion.

10. The aperture unit as claimed in claim 1, wherein the sliding element has a spherical shape.

11. The aperture unit as claimed in claim 1, wherein the first blade at least partially overlaps the recessed portion when viewed along the optical axis.

12. The aperture unit as claimed in claim 1, wherein the driving assembly does not overlap the recessed portion when viewed along the optical axis.

13. The aperture unit as claimed in claim 1, wherein the recessed portion is at least partially exposed from the guiding element when viewed along the optical axis.

14. The aperture unit as claimed in claim 1, wherein the sliding element is in contact with the guiding element.

15. The aperture unit as claimed in claim 1, further comprising a second blade movably connected to the guiding element and the fixed portion.

16. The aperture unit as claimed in claim 1, wherein the fixed portion comprises a bottom and a bottom plate, wherein the bottom plate is disposed between the bottom and the driving assembly.

17. The aperture unit as claimed in claim 16, wherein the bottom plate at least partially overlaps the driving assembly in a direction that the optical axis extends.

18. The aperture unit as claimed in claim 1, wherein the driving assembly comprises a magnetic element in contact with the guiding element, and a size of the magnetic element is less than a size of the guiding element in a direction perpendicular to the optical axis.

19. The aperture unit as claimed in claim 18, wherein the guiding element comprises a recess, and the magnetic element is partially accommodated in the recess.

20. The aperture unit as claimed in claim 18, wherein a distance between a first bottom surface of the bottom and a second bottom surface of the guiding element is greater than a distance between the first bottom surface of the bottom and a third bottom surface of the magnetic element.

* * * * *